United States Patent

Kobayashi et al.

[11] Patent Number: 5,096,027
[45] Date of Patent: Mar. 17, 1992

[54] DRUM BRAKE

[75] Inventors: Kinzo Kobayashi, Kanagawa; Shinichi Izumi, Tokyo, both of Japan

[73] Assignee: Tokico Ltd., Kanagawa, Japan

[21] Appl. No.: 631,346

[22] Filed: Dec. 20, 1990

[30] Foreign Application Priority Data

Dec. 20, 1989 [JP] Japan ............................. 1-146723[U]

[51] Int. Cl.⁵ ............................................. F16D 51/00
[52] U.S. Cl. ................................... 188/328; 188/329; 188/331; 188/341
[58] Field of Search ............... 188/328, 325, 329, 331, 188/341

[56] References Cited

U.S. PATENT DOCUMENTS

| | | | |
|---|---|---|---|
| 4,353,441 | 10/1982 | Roberts | 188/328 |
| 4,387,792 | 6/1983 | Imamura | 188/328 |
| 4,573,557 | 3/1986 | Shellhause | 188/331 X |
| 4,993,525 | 2/1991 | Hyde | 188/328 |
| 5,022,502 | 6/1991 | Shellhause | 188/341 X |

Primary Examiner—Joseph F. Peters, Jr.
Assistant Examiner—Christopher P. Ellis
Attorney, Agent, or Firm—Wenderoth, Lind & Ponack

[57] ABSTRACT

A drum brake including a backing plate adapted to be mounted on a non-rotatable member of a vehicle, the backing plate having a shaft hole formed therethrough at the center thereof for accommodating a shaft of the vehicle, a drum adapted to be mounted on a rotatable member of the vehicle, a pair of brake shoes mounted on the backing plate and arranged to be expandable in the radial direction of the drum, a connector connecting respective ends of each of the brake shoes together, an anchor with which the other end of each of the brake shoes are engageable, and mounting bolts for mounting the backing plate on the non-rotatable member of the vehicle. The mounting bolts are located outwardly of the shaft hole and close to each other. The anchor is also fixed to the non-rotatable member of the vehicle by the mounting bolts.

5 Claims, 7 Drawing Sheets

DRUM BRAKE

BACKGROUND OF THE INVENTION

1. Field of the Invention

The present invention relates to a drum brake for use in the brake system of a vehicle such as an automobile, and more particularly relates to a duo-servo type drum brake.

2. Prior Art

A drum brake known as a duo-servo type drum brake typically comprises a backing plate fixedly mounted on a non-rotatable member such as an axle housing of a vehicle, a drum mounted on a rotatable member such as a shaft, a pair of brake shoes expandably mounted on the backing plate by means of respective shoe hold-down units and adapted to be pressed onto the drum when they are expanded, a connecting means connecting lower ends of the respective brake shoes with each other, and an anchor with which the upper ends of the respective brake shoes are engageable. In the duo-servo type drum brake, self-servo operation occurs when the vehicle is advancing in any direction and in reverse, thereby generating a braking force.

It is to be noted that, in the duo-servo type drum brake, the shoe hold-down units only bias the respective brake shoes against the backing plate, and that the lower ends of the brake shoes connected with each other are in a floating condition. As a result, a braking torque generated when the vehicle is being braked, namely a braking force generated when the brake shoes are being pressed onto the drum acts on the anchor. The anchor must, therefore, be fixed securely.

FIGS. 1 to 6 show conventional ways for mounting an anchor on a backing plate. The same reference numerals will be used to designate the corresponding elements in the respective arrangements.

FIGS. 1 and 2 show a first conventional arrangement in which an anchor 1 is provided with a base portion 1a including two extended portions 1b. Shown at 1c is a torque receiving portion of the anchor 1. Shown at 2 and 2a are bolts for fixedly mounting the drum brake on a non-rotatable member of a vehicle such as an axle housing (not shown). The bolts 2 and 2a are respectively located on the lower and upper halves of a backing plate 3. The extended portions 1b respectively extend to the upwardly-located bolts 2a. On the reverse side of the backing plate 3 is mounted a first reinforcing plate 4 which is provided with generally the same shape as that of the base portion 1a. The backing plate 3, base portion 1a and reinforcing plate 4 are fixed together by means of rivets 5 with the backing plate being located between the other two. It is to be noted that a second reinforcing plate 6 is employed in order to reinforce the portions of the backing plate 3, base portion 1a and first reinforcing plate 4 around the rivets 5. In the drum brake with the above-described construction, a braking torque applied to the anchor 1 by the braking shoes 7, 8 is transmitted to the non-rotatable member of the vehicle through the integrated reinforced portion consisting of the backing plate 3, base portion 1a, and first and second reinforcing plates 4, 6, respectively, and through the bolts 2a.

FIGS. 3 and 4 show a second conventional arrangement for mounting an anchor 1 on a backing plate 3 in which upwardly located bolts 2a are located closer to the anchor 1 than in the case of the first-mentioned arrangement. For that reason, a thicker first reinforcing plate 4 is used instead of using a second reinforcing plate 6 in addition to a relatively thinner first enforcing plate as in the case of the first-mentioned arrangement. Rivets 5 are used to fix the backing plate 3, a base portion 1a of the anchor 1 and the reinforcing plate 4 to one another. A braking torque applied to the anchor 1 by brake shoes 7 and 8 is transmitted to a non-rotatable member of the vehicle through the integrated reinforced portion consisting of the backing plate 3, base portion 1a and reinforcing plate 4 and through the bolts 2a.

FIGS. 5 and 6 show a third conventional arrangement for mounting an anchor 1 on a backing plate 3. As best shown in FIG. 6, the anchor 1 is welded to a reinforcing plate 9 which is, in turn, welded to the backing plate 3. The reinforcing plate extends to one of mounting bolts 2a. The backing plate 3 is thicker than those employed in the first and second arrangements mentioned above.

However, drum brakes with the above-mentioned arrangements suffer from the following problems.

In any of the above-mentioned arrangements for mounting an anchor on a backing plate, a braking torque applied to the anchor is transmitted to a non-rotatable member of the vehicle through the backing plate, and a torque receiving portion of the anchor is located far away from bolts for mounting the backing plate on a non-rotatable member of the vehicle. As a result, these arrangements inevitably necessitate the use of reinforcing members for reinforcing the anchor and backing plate, which are fixed to the anchor and/or backing plate by means of rivetting, welding and the like. Namely, the conventional arrangements need many parts, resulting in an increase in manufacturing cost and also in an increase in the weight of the drum brake.

SUMMARY OF THE INVENTION

In view of the foregoing, it is the main object of this invention to provide a drum brake in which an anchor is fixed securely without any reinforcing members.

To achieve the object, the present invention provides a drum brake comprising a backing plate adapted to be mounted on a non-rotatable member of a vehicle, the backing plate having a shaft hole formed therethrough at the center thereof for accommodating a shaft of the vehicle, a drum adapted to be mounted on a rotatable member of the vehicle, a pair of brake shoes mounted on the backing plate and arranged to be expandable, connecting means having opposite ends each of which connects with one end of each of the brake shoes, an anchor with which the brake shoes are engageable at their respective other ends, and mounting bolts for mounting the backing plate on the non-rotatable member of the vehicle, the mounting bolts being located both remotely from the shaft hole with respect to a tangent of the shaft hole and close to each other, and the anchor being fixed to the non-rotatable member of the vehicle by means of the mounting bolts.

BRIEF DESCRIPTION OF THE DRAWINGS

Other objects and aspects of the invention will become apparent from the following description of a preferred embodiment with reference to the accompanying drawings in which.

DETAILED DESCRIPTION OF THE PREFERRED EMBODIMENT

Figure 1:
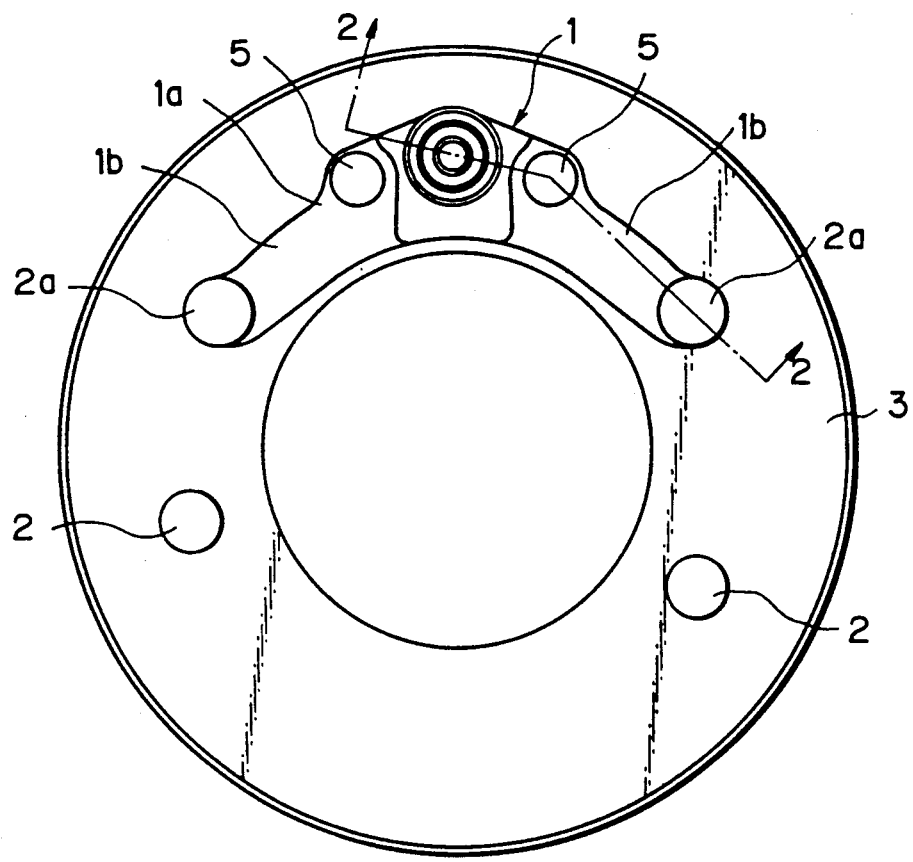
FIG. 1 is a front view of a main portion of a conventional drum brake.
Figure 2:
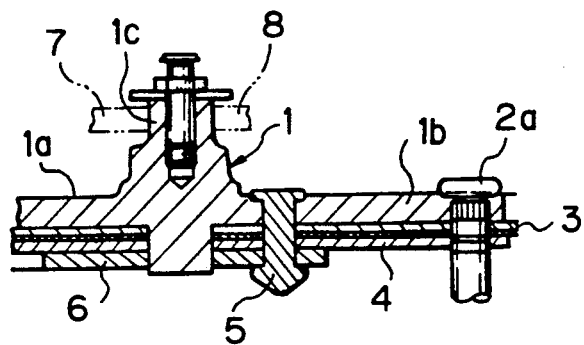
FIG. 2 is a sectional view taken along line 2—2 in FIG. 1.
Figure 3:
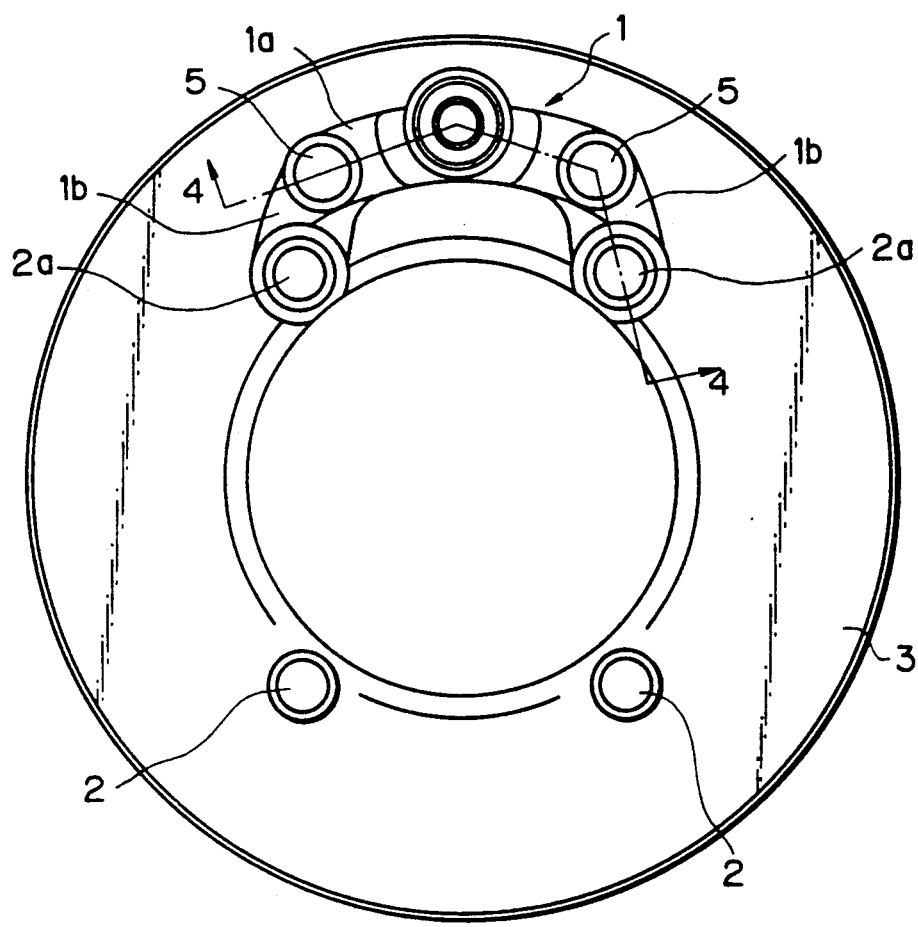
FIG. 3 is a similar view to FIG. 1 but showing another conventional drum brake.
Figure 4:
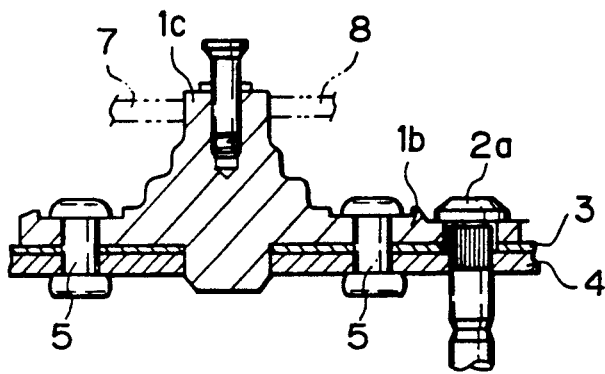
FIG. 4 is a sectional view taken along line 4—4 in FIG. 3.
Figure 5:
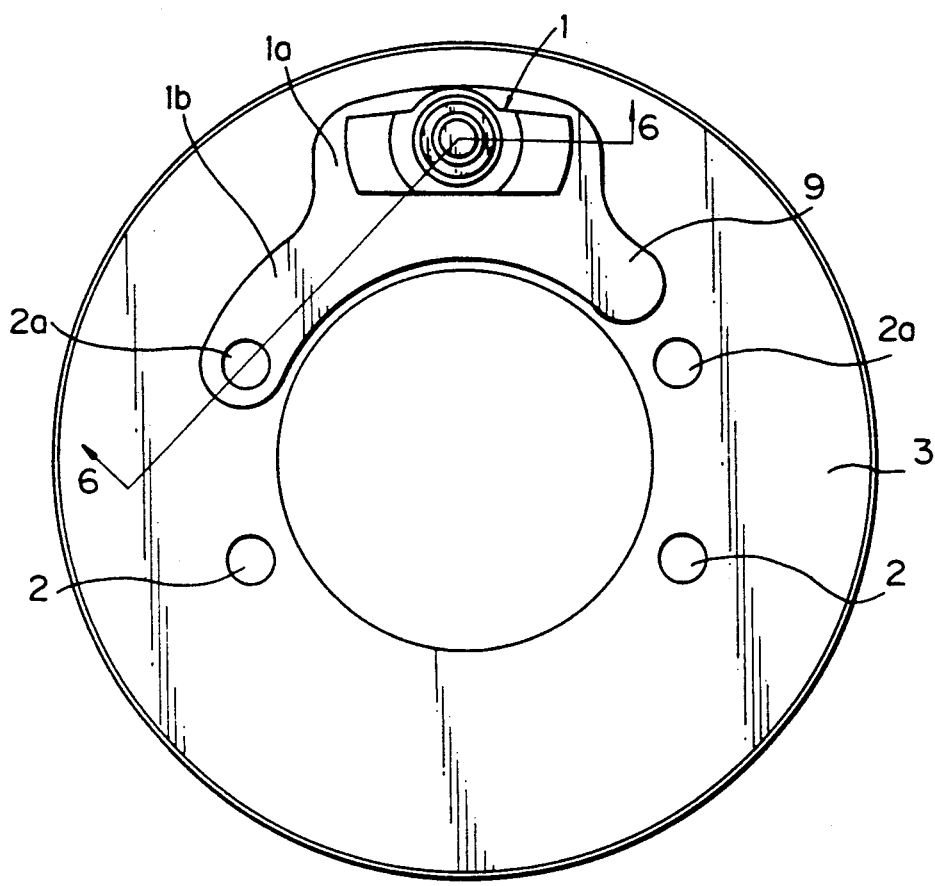
FIG. 5 is also similar view to FIG. 1 but showing a further another conventional drum brake.
Figure 6:
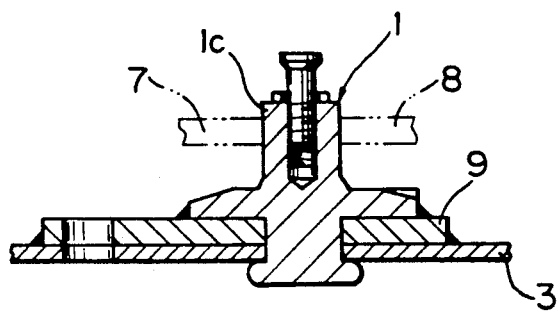
FIG. 6 is a sectional view taken along line 6—6 in FIG. 5.

Referring to FIGS. 7 to 12, a preferred embodiment of the present invention will be explained.

Numeral 10 designates a backing plate on which a pair of brake shoes or primary and secondary shoes 12 and 13, respectively, are mounted by means of respective shoe hold-down means 11. The brake shoes 12 and 13 are provided with linings 14 and 15 respectively attached to the outer surfaces thereof and webs 12a and 13a respectively extending radially inwardly. The shoe hold-down means 11 are mounted upright on the backing plate, and each hold-down means 11 includes a pin 16 extending through a hole formed in the web 12a (13a) of the brake shoe 12 (13), a bracket 17 mounted on the top of the pin, and a shoe hold spring 18 disposed between the bracket 17 and the web 12a (13a). The shoe hold springs 18 function to bias the respective brake shoes 12 and 13 against the backing plate. The backing plate 10 is further provided with ledges 10a formed integrally therewith to be in partial contact with and guide the respective brake shoes 12 and 13 when the shoes are expanded.

Lower ends of the brake shoes 12, 13 are connected with each other by connecting means 23 including an adjusting cylinder 19 and a spring 20, while upper ends of the brake shoes engage an anchor 24 in a manner which will be described later. A return spring 25 biases the brake shoe 12 against the anchor 24 with one end thereof being connected to the web 12a and with the other end being connected to the anchor 24. Another return spring 26 biases the brake shoe 13 against the anchor 24 in the same manner as in the case of the return spring 25.

A parking lever 28 is pivotally mounted on the web 13a of the brake shoe 13 at one end thereof by means of a stud 27. The other end of the parking lever 28 is connected with a cable 29 which is, in turn, connected to a brake lever (not shown) mounted in a compartment of a vehicle. Shown at 30 is a strut bridging the parking lever 28 and the primary shoe 12.

The backing plate 10 is provided with a shaft hole 10b centrally formed therethorugh. A rotatable shaft S of the vehicle extends through the shaft hole 10b and a brake drum (not shown) is mounted on the extending end of the shaft S. The inner surface of the brake drum opposes the outer surfaces of the brake shoes 12 and 13.

Numeral 34 designates a baffle plate fixed to the backing plate 10.

Figure 7:
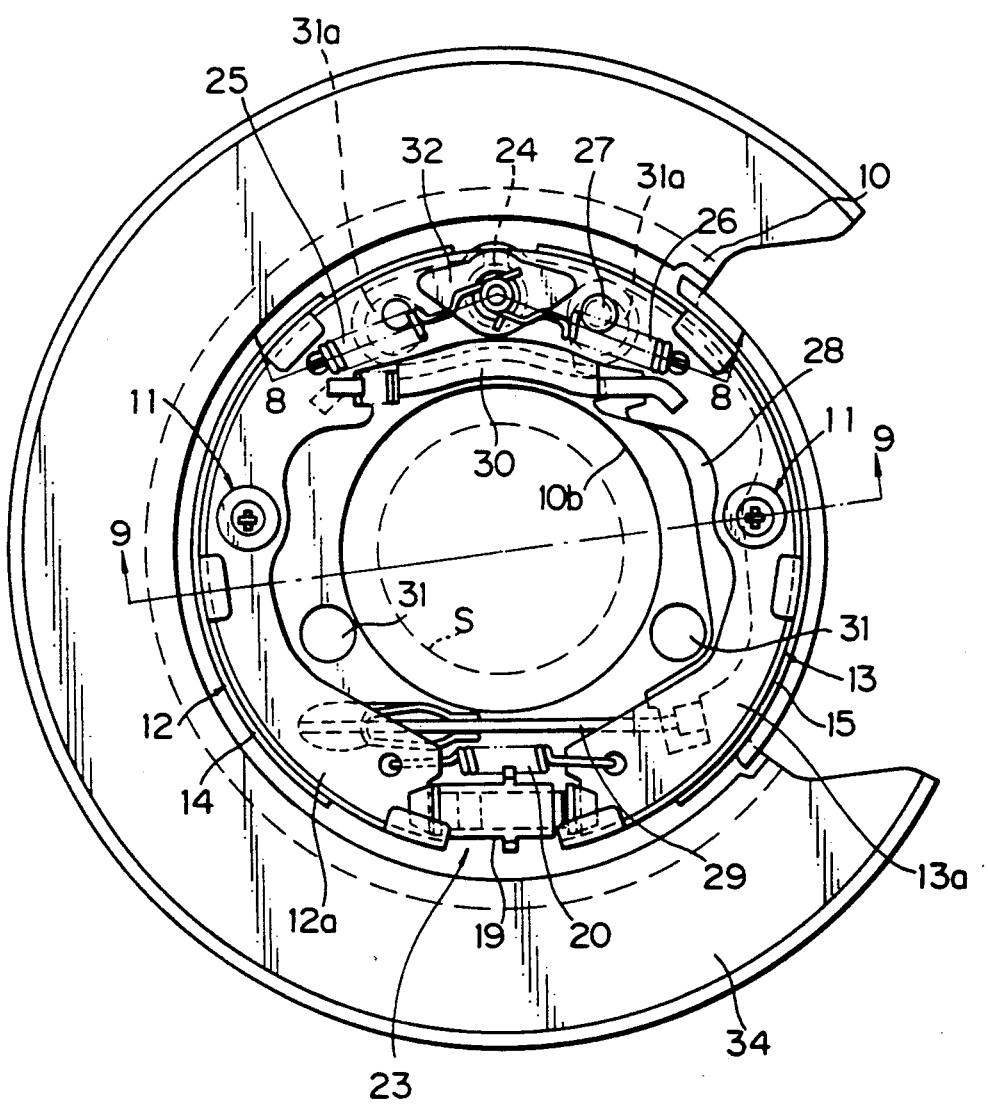
FIG. 7 is a front view of an embodiment of a drum brake according to the present invention.
Figure 8:
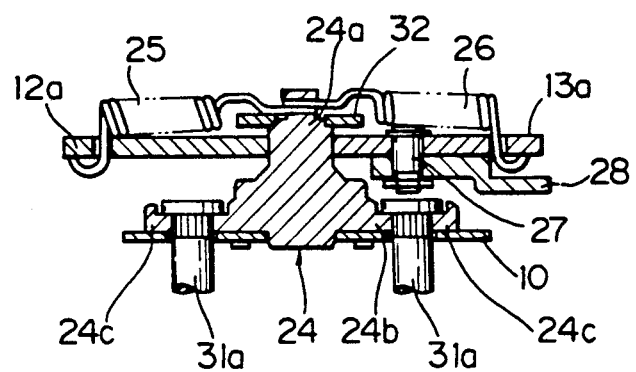
FIGS. 8 and 9 are sectional views taken along lines 8—8 and 9—9, respectively, in FIG. 7.
Figure 9:
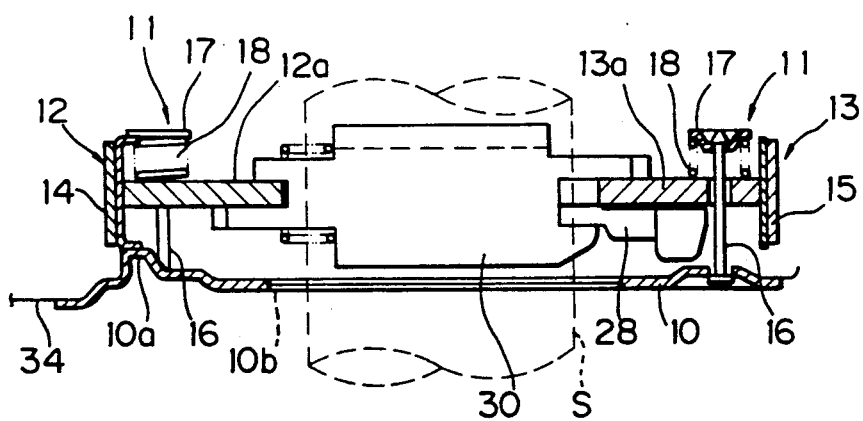
Figure 10:
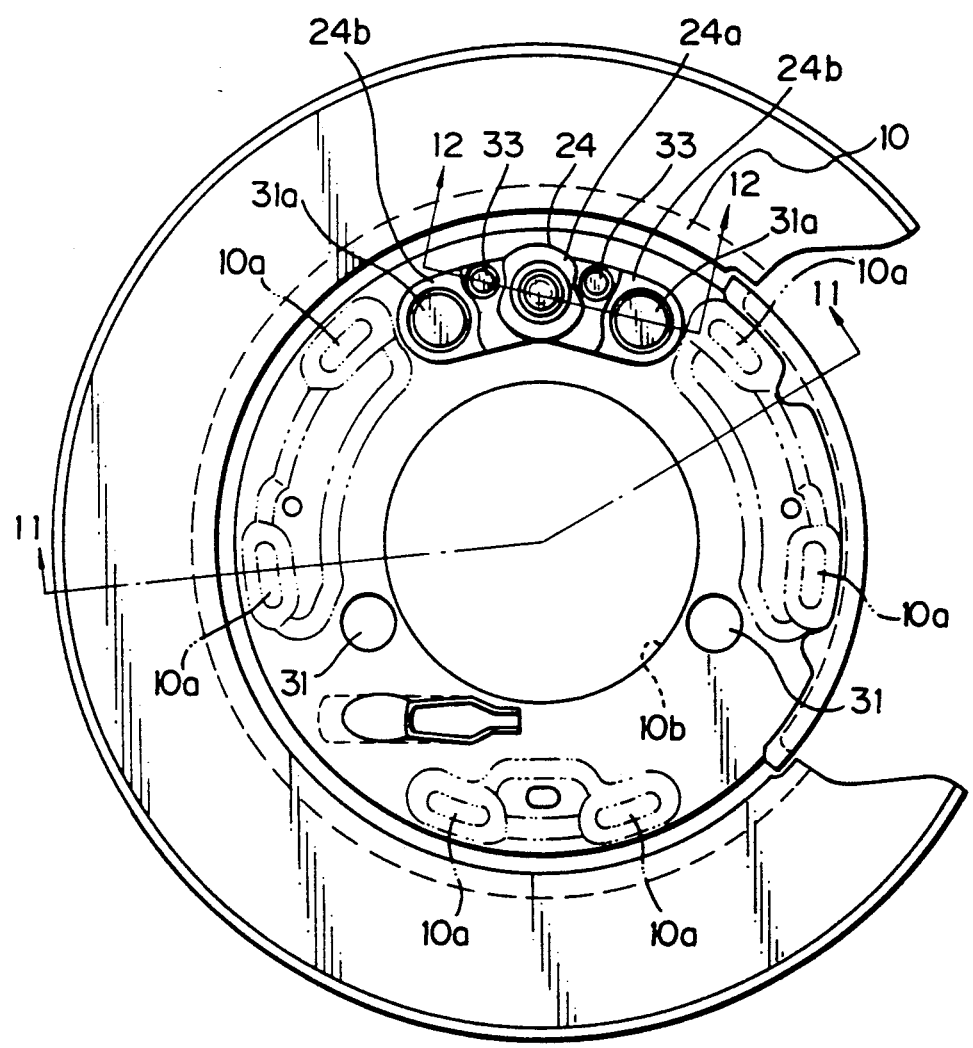
FIG. 10 is a front view of a portion of the present invention showing a manner in which an anchor and a backing plate of the drum brake shown in FIG. 7 are assembled.
Figure 11:
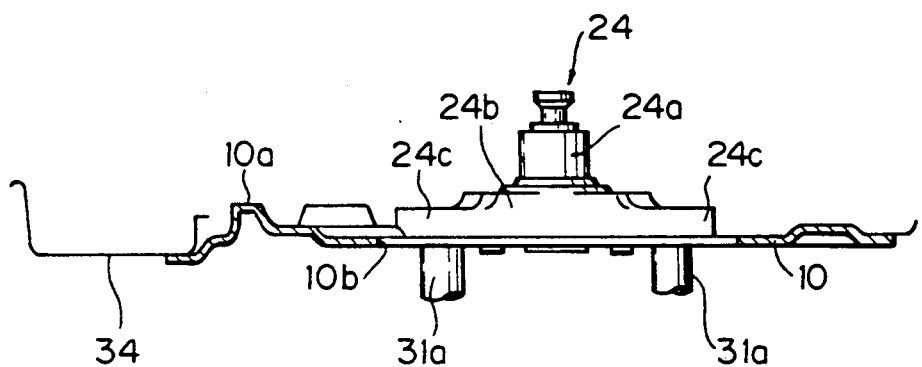
FIGS. 11 and 12 are sectional view taken along lines 11—11 and 12—12, respectively, in FIG. 10.
Figure 12:
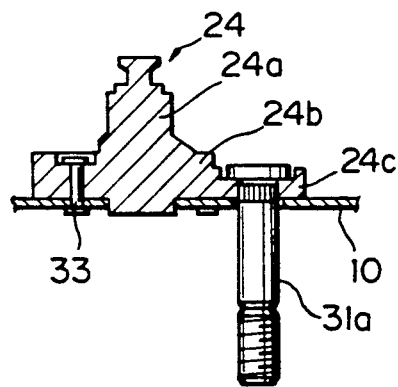

In operation, when the driver pulls the brake lever in the compartment, the parking lever 28 is rotated around the stud 27 in the clockwise direction as viewed in FIG. 7 and the parking lever 28 and the strut 30 cooperate with each other to expand or radially move the brake shoes 12 and 13 away from each other, thus pressing the brake shoes 12 and 13 onto the inner surface of the brake drum. When the shaft S rotates in the counter-clockwise direction, a braking torque generated by virtue of frictional contact between the primary shoe 12 and the brake drum act to push the lower portion of the secondary shoe 13 through the connecting means 23, whereby self-servo operation is exerted on both of the brake shoes 12 and 13 to generate a great braking force. When the shaft S rotates in the opposite direction, self-servo operation is also exerted on both brake shoes.

Next, the mounting structure of the anchor 24 which is a main part of the present invention will be described.

Two pairs of mounting bolts 31 and 31a are used to mount the backing plate 10 on a non-rotatable element (not shown) of the vehicle. One pair 31 is located on the lower half of the backing plate 10 while the other pair 31a is located on the upper half of the backing plate 10. It is to be noted that the upper mounting bolts 31a are located remotely from the shaft hole 10b with respect to a line which is tangent to the shaft hole 10b at the uppermost point along the circumference of the hole 10b and extends laterally as viewed in FIG. 10, and that the bolts 31a are also located close to each other.

The anchor 24 includes a base portion 24b mounted on the backing plate 10 and a column portion 24a provided on the base portion 24b. The brake shoes 12 and 13 engage the column portion 24a of the anchor 24. A stop plate 32 is mounted on the top of the column portion 24a to prevent the brake shoes 12 and 13 from moving upwardly away from the backing plate. The base portion 24b includes two extended portions 24c extending downwardly and oppositely outwardly away from the column portion 24a as viewed in FIG. 7. In the outer end of each of the extended portions 24c is formed a hole through which one of the upper mounting bolts 31a is press-fitted. The mounting bolts 31 and 31a are inserted through respective holes formed in the non-rotatable member of the vehicle and then nuts (not shown) are respectively threadedly mounted on the mounting bolts 31 and 31a and fastened to fix both the anchor 24 and backing plate 10 to the non-rotatable member. It is to be noted that the column portion 24a and the outer ends of the extended portions 24c of the anchor 24 are located generally along a circle centered on the center of the shaft hole 10b.

It is also to be noted that rivets 33 of a small diameter are also used to fix the anchor 24 to the backing plate 10. The purpose of the rivets 33 is to temporarily fix the anchor 24 to the backing plate 10 to prevent the anchor 24 from being dismounted from the backing plate 10 before the backing plate 10 is fixed to the non-rotatable member of the vehicle.

As explained above, the backing plate 10 of the present embodiment is merely clamped between the anchor 24 and the non-rotatable member of the vehicle and the anchor 24 is firmly fixed directly to the non-rotatable member by means of the mounting bolts 31a. In other words, a braking torque is substantially directly transmitted from the anchor 24 to the non-rotatable member through the mounting bolts 31a, not through the backing plate 10. The drum brake of the present invention needs no reinforcing member for reinforcing the backing plate and eliminates the need for manufacturing operations such as rivetting, welding and the like necessitated with the employment of reinforcing members, thus resulting in a decrease in manufacturing costs as well as in the weight of the drum brake.

It is also to be noted that the anchor 24 can be made more compact than those in the conventional drum brake, since the mounting bolts 31a are located close to each other. This fact also contributes to a reduction in manufacturing costs and in the weight of the drum brake.

The above explanation has been given with respect to the case in which the present invention is applied to a duo-servo type drum brake of a parking brake system. It should be noted, however, that the present invention may also been applied to a duo-servo type drum brake of a brake system for braking a running vehicle.

What is claimed is:

1. A drum brake for use in the brake system of a vehicle such as an automobile, the drum brake comprising:
    a backing plate adapted to be mounted on a non-rotatable member of the vehicle, said backing plate having a shaft hole formed therethrough at the center thereof for accommodating a shaft of the vehicle, and bolt-receiving holes therethrough;
    a drum adapted to be mounted on a rotatable member of the vehicle;
    a pair of brake shoes mounted on said backing plate so as to be expandable in the radial direction of said drum;
    connecting means for connecting respective ends of each of said brake shoes together;
    an anchor member resting on said backing plate, said anchor member including a column portion, said brake shoes being engageable at the other ends thereof with said column portion at opposite sides of said column portion, and said anchor member including two extending portions extending from said column portion in opposite directions; and
    mounting bolts for mounting said backing plate and said anchor member on the non-rotatable member of the vehicle, each of said mounting bolts having one end fixedly connected to a respective one of said extended portions of said anchor member and the other end adpated to be fixedly connected to the non-rotatable member of the vehicle, said mounting bolts being located remotely from said shaft hole with respect to a line tangent to the shaft hole at an uppermost point along a circumference of the shaft hole, said mounting bolts being located close to each other, said mounting bolts extending freely loosely through said bolt-receiving holes of said backing plate, respectively, such that a braking torque applied to said brake shoes will be substantially directly transmitted to the non-rotatable member from said achor member through said mounting bolts without acting through said backing plate.

2. A drum brake according to claim 1, wherein said mounting bolts are fixed to respective outer ends of said extended portions, and wherein said column portion and said outer ends are located along a common circle.

3. A drum brake according to claim 2, wherein the center of said circle coincides with the center of said shaft hole.

4. A drum brake according to claim 2, wherein the outer ends of said extended portions have holes therethrough, and wherein said mounting bolts are press-fitted to said anchor members within said holes in the outer ends of said extended portions.

5. A drum brake according to claim 1, and further comprising rivets of a small diameter directly fixing said anchor to said backing plate.

* * * * *